D. K. ALLINGTON.
Saw-Filing Machines.

No. 209,849.   Patented Nov. 12, 1878.

Attest:
Frederic J. Baxton
S. M. Hunter

Inventor:
David K. Allington

UNITED STATES PATENT OFFICE.

DAVID K. ALLINGTON, OF EAST SAGINAW, MICHIGAN.

IMPROVEMENT IN SAW-FILING MACHINES.

Specification forming part of Letters Patent No. 209,849, dated November 12, 1878; application filed March 27, 1877.

*To all whom it may concern:*

Be it known that I, DAVID K. ALLINGTON, of East Saginaw, in the county of Saginaw and State of Michigan, have invented certain new and useful Improvements in Saw-Filing Machines, of which the following is a specification:

The object of my invention is to produce a machine having means for supporting and guiding a file, intended to be reciprocated by hand, and devices for clamping a circular saw while being filed, which will be simple in construction and conveniently applied, the machine being adapted to sharpen circular saws of any size, and to file large saws when mounted either on the running arbor or on a filing-arbor made for that purpose; and my invention therein consists in the peculiar means employed for supporting and guiding the file, whereby it can be adjusted to give the teeth any desired bevel or "fleam," or to sharpen them with square or hook faces; and, further, in the peculiar clamp for holding circular saws of all sizes when mounted directly upon the machine on a separate filing-arbor or on the running arbor, all as fully hereinafter explained.

Figure 1:
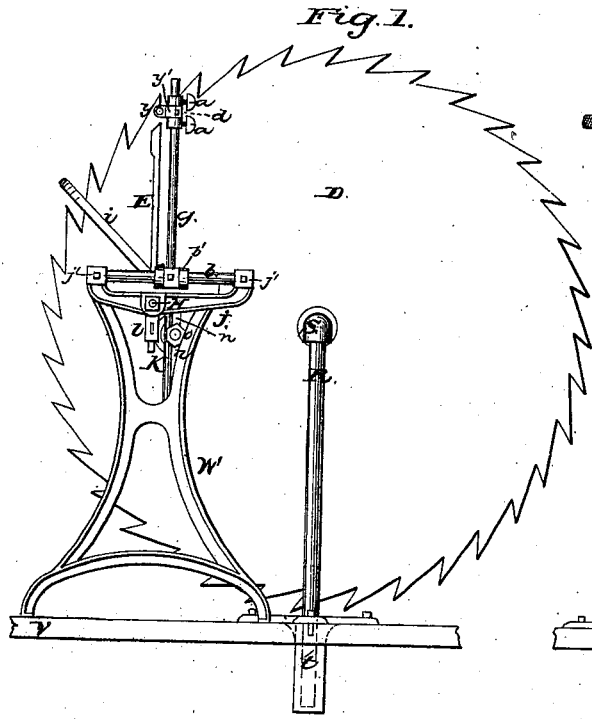
Figure 2:
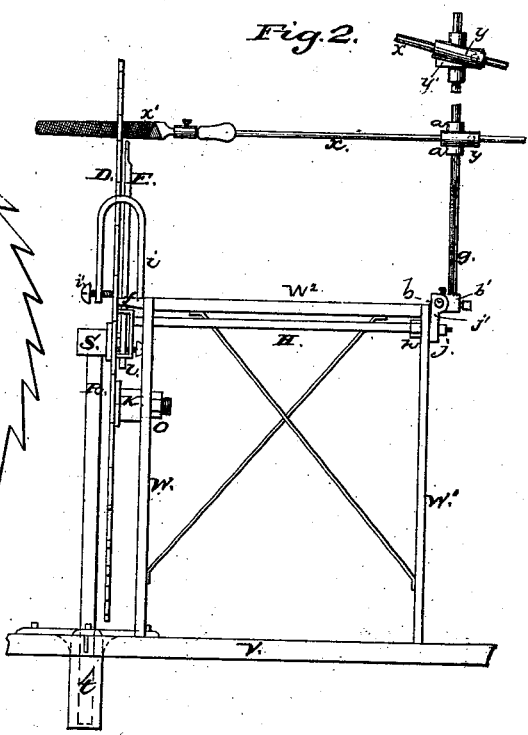
Figures 3, 4:
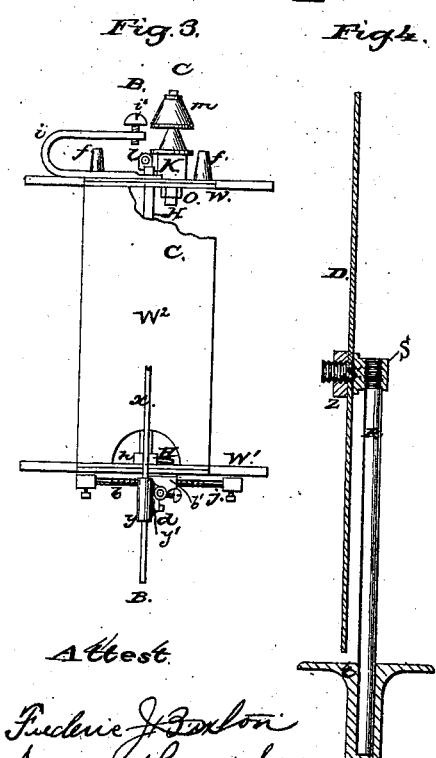
Figures 5, 6:
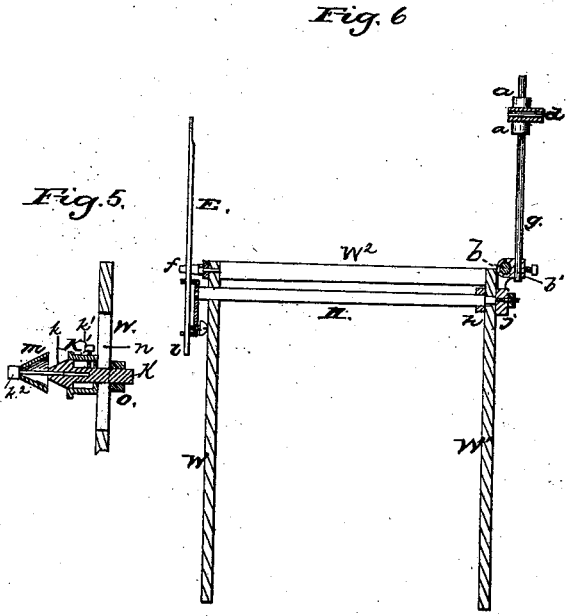

In the drawings, Figure 1 is a rear elevation of the machine, showing a circular saw mounted in position on the filing-arbor; Fig. 2, a side view of the same; Fig. 3, a top view of the machine, with the means shown for holding small-sized saws; Fig. 4, a section of the arbor for carrying large saws; Fig. 5, a vertical section through a portion of the frame of the machine, showing the means for holding small saws, and the slot in the frame by which said means are made vertically adjustable; and Fig. 6, a central longitudinal section of the machine.

Like letters denote corresponding parts in all the figures.

The standards W W¹, suitably constructed, support the table W² of the machine, and are designed to stand upon the floor of a shop without being secured thereto, so that the machine can be easily moved about. In the standards W W¹ is journaled a rock-shaft, H, extending from one standard to the other, beneath the table, and projecting a short distance on the outside of each standard. On the rear end of the shaft H, outside of the standard W¹, is fixed the bracket $j$, having upwardly-extended ends $j'$, in which is placed a bar, $b$, held by set-screws. This bar may be suitably graduated on its upper surface.

Upon the bar $b$ slides a block, $b'$, secured at any point thereon by a set-screw. This block carries an adjustable rod or bar, $g$, adapted to be moved up and down in the said block at right angles to the bar $b$, and held by a set-screw.

Near the upper end of the rod $g$, between adjustable collars $a$, is placed a revolving block, $y'$, to which block is pivoted so as to swing vertically a block, $y$, forming a universal joint. In the block $y$ slides the rod $x$, having a socket at one end, in which the tang of the file $x'$ is secured by a set-screw. The rod $x$ and the file are adapted to be reciprocated by hand.

On the opposite end of the shaft H from the bracket $j$ is secured the socket-plate $l$, in which slides a guide-rod, E, placed parallel to the rod $g$ and close to the face of the standard W. This guide-bar is adjustable in the socket-plate, and is held therein by means of a set-screw.

The parts supported by the bracket $j$ and the guide-rod E rock with the shaft H, a nut, $h$, being placed on such shaft and turning against the inside of the standard W¹, by which the shaft can be locked at any point in its movement. An opening may be made through the table W² near the standard W¹, to give convenient access to the nut $h$ for turning the same. By these means the file-carrying rod $g$ can be raised or lowered, moved from one side of the machine to the other, and inclined to any angle desired.

On the face of the standard W, near its upper end, are cast or secured two studs, $f$, projecting at right angles to the standard. Between these studs $f$ is pivoted to the standard one arm of a clamp, $i$, of an elongated U form, the other arm of this clamp terminating opposite the standard near the point where the clamp is pivoted. A screw, $i'$, is placed in the end of the outer arm of the clamp, setting inwardly through such arm. In use the clamp $i$ embraces the periphery of a circular saw, which is laid flat against the studs $f$.

The saw is held rigidly by turning the screw $i'$, which forces it against the studs, and the clamp $i$, by being pivoted, can be swung around to embrace the saw near the point of filing, so as to hold the same more securely, and prevent it from vibrating when the file is being operated. This machine can be used for filing large saws while on the running arbor by moving the machine into such a position that the saw can be clamped against the studs $f$. When this is impossible or inconvenient, I have designed to use a separate filing-arbor. This consists of a standard, R, stepped in a socket, $t$, secured in the floor V, and adapted to be turned in such socket. The upper end of the standard R is provided with a horizontal screw-threaded arm, and a nut turning on such arm, to secure a saw, D, to such standard. After the saw is mounted on the standard the machine is moved into the position shown in Fig. 1 and the saw clamped ready for filing. As each tooth is filed, or after the sharpening of a small number of teeth, the set-screw $i'$ is released, and the saw turned to advance the teeth the required distance, when it is again clamped.

If it is desired to file from the opposite side of the saw, the machine is moved a short distance from the saw, the standard R given a half-revolution, and the machine again advanced and the saw clamped, as before.

For small saws, I provide means by which they can be mounted directly upon the frame of the machine. For this purpose the standard W is provided with a vertical slot, $n$, near one side of the same. In this slot slides an arm, K, having a nut, $o$, on its inner end. This arm has a conical centering-head, $k$, to receive saws with eyes of different sizes. A sleeve, K', of the same depth as the length of one of the studs $f$, is placed on the arm K, outside of the standard W, and by a set-screw, $k^1$, is secured to such arm and adjusted thereon so as to center the saws. A conical cap, $m$, fits over the head $k$, and clamps a saw thereto by means of a screw, $k^2$, which passes through the cap and turns in the end of such head.

After a saw is secured upon the head of the arm K, between the sleeve K' and the cap $m$, the arm is adjusted in the slot $n$ so as to bring the saw in the right position between the arms of the clamp $i$, and the nut $o$ is then turned to hold the saw at that elevation.

In filing a saw, the proper adjustment is first given to the block $y$ by the devices described.

By means of the guide-rod E, the position of the arm $g$ with relation to a saw-tooth being filed can be readily ascertained and adjusted.

What I claim as my invention, and desire to secure by Letters Patent, is—

1. The combination, with the shaft H, of the arm $g$, supported at one end of the same and guiding the file-carrying arm, and the guide-rod E, at the opposite end of such shaft, placed parallel to the said arm, substantially as and for the purpose set forth.

2. The combination, with the arm $g$, vertically adjustable in a block, and adapted to be moved laterally and to be inclined in a vertical plane, as desired, of the block $y'$, revolving upon such arm, and the block $y$, pivoted to the block $y'$, and guiding the file-carrying arm, substantially as and for the purpose set forth.

3. The combination, with the shaft H, of the brackets $j'$, bar $b$, block $b'$, sliding upon such bar, rod $g$, adjustable in said block, blocks $y$ $y'$ on the said rod, and the file-carrying arm, constructed and arranged substantially as described and shown.

4. The combination of the studs $f$ on the face of the standard W, and the swinging loop-clamp $i$, having set-screw $i'$, constructed and arranged substantially as described and shown.

DAVID K. ALLINGTON.

Witnesses:
FREDERIC J. BENTON,
A. M. HUNTER.